United States Patent [19]

Ryden

[11] Patent Number: 5,319,397
[45] Date of Patent: Jun. 7, 1994

[54] DEFOGGING EYEGLASSES

[76] Inventor: William D. Ryden, 3348 Springridge Cir., Colorado Springs, Colo. 80906

[21] Appl. No.: 947,740

[22] Filed: Sep. 21, 1992

[51] Int. Cl.⁵ .......................... G02C 5/08; G02C 3/00
[52] U.S. Cl. ..................... 351/62; 351/156; 351/157
[58] Field of Search ..................... 351/62, 156, 157

[56] References Cited

U.S. PATENT DOCUMENTS

| | | | |
|---|---|---|---|
| 1,488,085 | 3/1924 | Zachara | 2/435 |
| 1,963,990 | 6/1934 | Gilkeson et al. | 2/14 |
| 2,888,703 | 6/1959 | Karwowska | 15/250.27 |
| 3,024,341 | 3/1962 | Ogle, Jr. et al. | 219/20 |
| 3,027,561 | 4/1962 | Senne | 2/14 |
| 3,160,735 | 12/1964 | Aufricht | 219/201 |
| 4,209,234 | 6/1980 | McCooeye | 351/62 |
| 4,584,721 | 4/1986 | Yamamoto | 2/424 |
| 4,633,532 | 1/1987 | Yagasaki | 2/424 |
| 4,638,728 | 1/1987 | Elenewski | 98/2.08 |
| 4,682,007 | 7/1987 | Hollander | 219/211 |
| 4,868,929 | 9/1989 | Curcio | 2/435 |
| 4,942,629 | 7/1990 | Stadlmann | 2/435 |
| 4,996,981 | 3/1991 | Elenewski et al. | 128/201.15 |

FOREIGN PATENT DOCUMENTS

| | | | |
|---|---|---|---|
| 373865 | 4/1923 | Fed. Rep. of Germany | 351/62 |
| 0027014 | 2/1991 | Japan | 351/62 |
| 264280 | 1/1927 | United Kingdom . | |
| 489530 | 7/1938 | United Kingdom . | |

Primary Examiner—Richard A. Bertsch
Assistant Examiner—Alfred Basichas
Attorney, Agent, or Firm—Linda Flewellen Gould

[57] ABSTRACT

Eyeglasses worn in winter weather conditions are subject to fogging due to condensation of water vapor. A method of removing condensation from eyeglasses is provided. The method involves heating the lenses of the eyeglasses, by making the lenses a part of an electrical circuit. Electric current is supplied to the electric circuit from a power source external to the eyeglasses. The size and weight of the power source may be minimized by utilizing a timer or a power regulator. A smaller power source is also made possible by selectively heating the lenses, applying more power in the area of the lenses most likely to experience fogging.

14 Claims, 4 Drawing Sheets

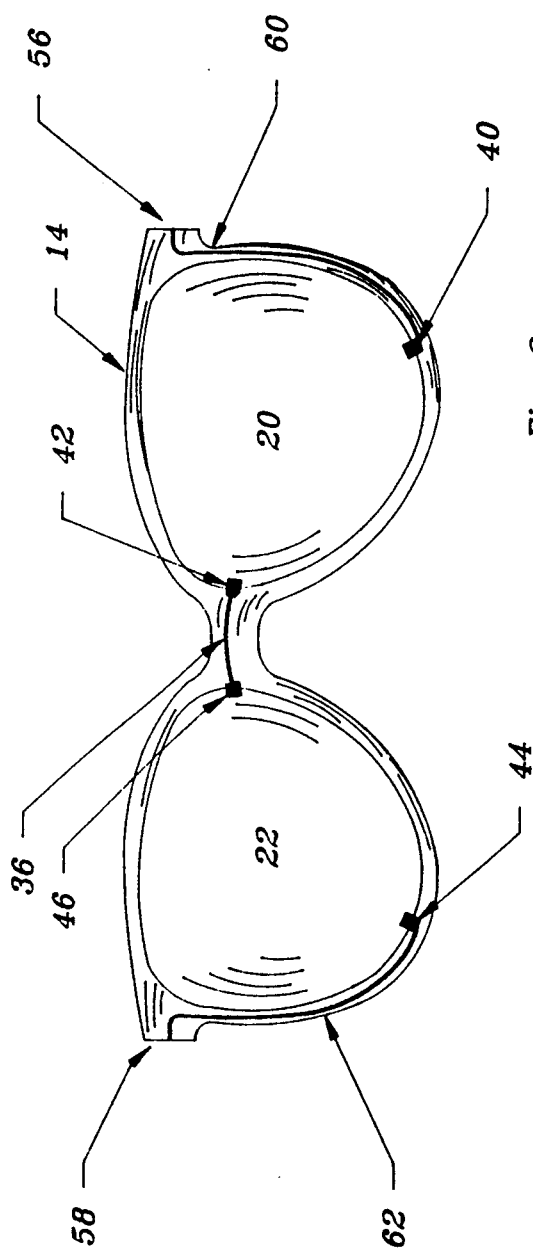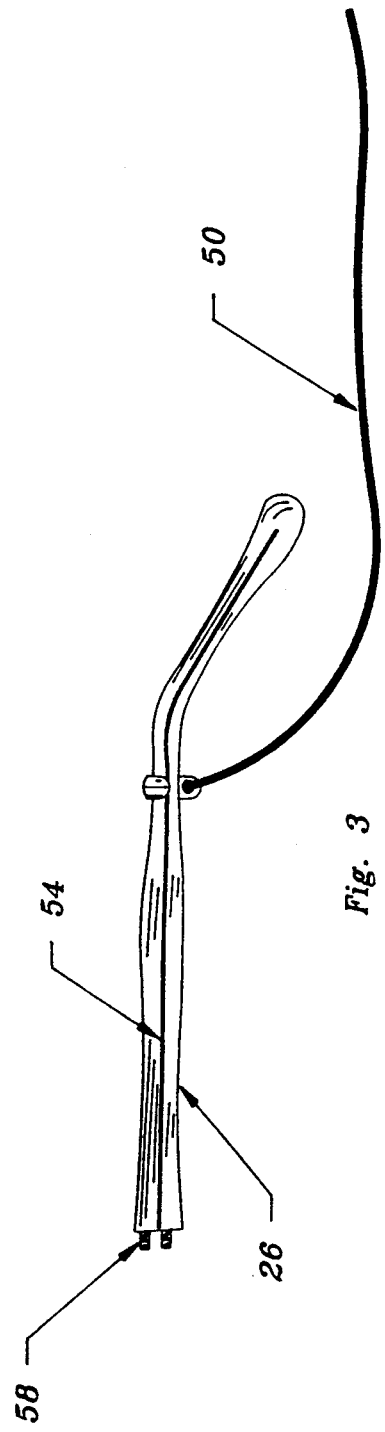

DEFOGGING EYEGLASSES

BACKGROUND OF THE INVENTION

1. Technical Field

This invention pertains to a method and device for removing condensation from eyeglasses.

2. Background Art

Eyeglasses used out-of-doors in cold climates are subject to fogging due to the accumulation of water vapor on the lenses. Such condensation hinders the user's ability to see through the lenses, whether the lenses are optically corrective or simply to protect the user's eyes from bright sunlight.

The use of electrical heating to prevent or remove condensation on lenses or face masks is known in the prior art. For example, U.S. Pat. No. 4,209,234 to McCooeye discloses a pair of eyeglasses in which a battery is mounted on the temples of the glasses to supply power to an electrical circuit which includes a conductive transparent film covering the lenses of the eyeglasses. Great Britain Patent No. 489,530 reveals lenses which are coated with a conductive metal paint, and which are superimposed on a second set of lenses, embedding a wire which forms a portion of an electrical circuit for heating the lenses. U.S. Pat. No. 3,160,735 to Aufricht, like McCooeye, relies on a battery mounted in the temple of eyeglasses. This miniature battery supplies power to an electrical circuit which includes a wire around each lens. Batteries mounted on the glasses themselves increase the weight of the glasses and cause the glasses to be considerably different in appearance and in construction than standard eyeglasses. Furthermore, the use of miniature batteries, which enables these designs to be comfortably worn, results in a maximum time for supplying power of approximately one to two hours under moderate fogging conditions, and no more than ten minutes in severe fogging conditions, which is significantly less than is required to permit defogging during a day of work or sports.

A number of specialized goggles and helmets are known in the prior art, which achieve defogging based on an electrical circuit supplied from an exterior power supply such as a vehicle electrical system. See, for example, U.S. Pat. No. 4,638,728 to Elenewski, U.S. Pat. No. 4,584,721 to Yamamoto, U.S. Pat. No. 3,024,341 to Ogle Jr. et al., and U.S. Pat. No. 4,682,007 to Hollander. Use of the external vehicle power source alleviates the problems associated with using a small battery pack to defog eyewear, and allows virtually limitless time periods for heating the eyewear. These designs are useful for activities involving consistent contact with a vehicle, such as snow mobiling. However, reliance on an external vehicle power source makes it impossible to utilize these defogging systems in sports such as skiing.

Goggles which may be heated to achieve defogging are revealed in U.S. Pat. No. 4,942,629 to Stadlmann, U.S. Pat. No. 3,027,561 to Senne, Great Britain Patent No. 264,280, U.S. Pat. No. 1,963,990 to Gilkeson et al., and U.S. Pat. No. 4,868,929 to Curcio. The power source used in Stadlmann is a solar cell mounted in a headband, which provides less than optimum heating capacity on cloudy days. Senne and Great Britain 264,280 are geared toward applications other than winter weather, and each relies on wires embedded in lenses to complete an electrical circuit and heat the lenses. Similarly, a wire is embedded in aircraft and ski goggles in Gilkeson and Curcio respectively, to heat the lenses and accomplish defogging.

Other eyewear or helmets with mechanisms for clearing condensation are known in the prior art. U.S. Pat. No. 4,996,981 to Elenewski et al. describes a visor to be used by a fireman or miner with an electrically activated heater or fan to prevent condensation from forming on the visor. U.S. Pat. No. 4,633,532 to Yagasaki and U.S. Pat. No. 2,888,703 to Karwowska both involve the use of miniature "windshield wipers" to remove condensation. Finally, U.S. Pat. No. 1,488,085 to Zachara discloses an electrically powered eye glass frame which is intended to be used as a light source.

While each of these mechanisms known in the prior art may be useful for its intended purpose, no mechanism is known which may be used to defog eyeglasses for a period as long as a day during use in winter weather, while achieving a customary construction, appearance, and weight for the eyeglasses. There exists a need for a defogging mechanism which can be used for a period of at least six hours during outdoor winter work or sports activities, while maintaining the comfort and typical appearance of eyeglasses. Ideally, such a defogging mechanism should permit the eyeglasses to be manufactured by existing production techniques, to avoid additional expense. Furthermore, this defogging means should utilize a convenient, portable, and economical power source.

DISCLOSURE OF THE INVENTION

Summary of the Invention

An object of this invention is to provide a method of defogging eyeglasses while maintaining a standard appearance, construction, and weight for those glasses.

Another object of this invention is to provide a defogging mechanism which utilizes a power source which is portable and convenient to carry, while economically providing sufficient power to remove condensation as needed during a day of outdoor winter work or sports.

The device used in this method of defogging eyeglasses resembles standard prescription glasses or sunglasses, with two lenses held by a lens holding segment. The lens holding segment may be supported on the user's face by a left temple segment and a right temple segment, or may be attached to another pair of eyeglasses. A conductive path is provided by which electrical current is carried to and from a power source external to the eyeglasses. By placing the power source external to the eyeglasses, its additional weight, which would be cumbersome to the wearer if added to the eyeglasses, can be located more advantageously. The user may thereby choose a number of ways to conveniently carry the power source, including attaching the power source to a belt or other article of clothing.

The conductive path may be constructed in a number of ways. For example, if the lens holding segment is non-conductive, and the lens holding segment is attached to left and right temple segments, the conductive path may be formed by running a wire from the power source to the left temple segment, and another wire from the power source to right temple segment. Each such wire may be flexibly supported on a neck strap which runs behind the user's head and down the user's back to the power supply. The two wires may then be connected to other wires, one running from along the left temple segment and the other along the right temple segment, to contact an outer left contact point in contact with the left lens and a outer right contact point in contact with the right lens respectively. A wire mounted on the bridge of the lens holding segment forms a portion of the conductive path, running from an inner left contact point in contact with the left lens to an inner right contact point in contact with the right lens. The electrical circuit is completed by making the lenses capable of conducting an electric current, so that current is carried across each lens between the inner contact point and outer contact point of that lens, causing the lenses to be heated when current is supplied.

A number of methods may be used to make the lenses capable of conducting an electric current. For example, the lenses may be coated with a transparent conductive coating, such as indium tin oxide. A thin metallic film may, alternatively, be applied to said lenses. Similarly, the lenses may be constructed in multiple layers, with thin wires embedded between layers, or may simply be constructed of conductive materials.

The conductive path described above to be utilized when the lens holding segment is non-conductive is a series configuration. A more efficient conductive path may be achieved by using a parallel configuration, resulting in a reduction in lens heater load and therefore increase in heat generation across the lenses compared to the series conductive path, using the same power source voltage. In the parallel configuration, the lenses are held in place by an upper lens holding segment and a lower lens holding segment. The upper lens holding segment is secured to the lower lens holding segment by a non-conductive securing mechanism. The lens holding segments are then held in place on the user's face by left and right temple segments, or by clipping the lens holding segments onto a pair of glasses to be worn by the user. When the clip-on method of attachment is used, the defogging lens holding segments will typically be held in place between the user's eyes and the glasses to which the defogging lens holding segments are attached, with an air blocking means lining the lens holding segments to contact the glasses and prevent air from moving through the area between the glasses and the lens holding segments.

The conductive path in a parallel configuration may be constructed by running a wire forming an upper conductive path from the power source, to a point on the upper lens holding segment, or a point which is in electrical contact with the upper lens holding segment. A second wire, forming the lower conductive path, is similarly run from the power source to the lower lens holding segment or a point in electrical contact therewith. If the eyeglasses are held in place by left and right temple segments, such as metal rim sunglasses, then the upper conductive path may be run to one of the temple segments, and the lower conductive path may be run to the other temple segment. One of the temple segments is attached to the upper lens holding segment, and the other temple segment is attached to the lower lens holding segment. The conductive path may be completed by making the lenses conductive, and by either constructing the temple segments and lens holding segments of conductive materials, or by running a wire from the point at which the upper conductive path contacts a temple segment to conductive points in contact with the upper half of each lens, while running another wire from the point at which the lower conductive path contacts the other temple segment to conductive points in contact with the lower half of each lens.

Both the parallel and series configurations of conductive paths enable the eyeglasses to be constructed in ways which utilize existing eyeglass formation technology and are thus relatively economical. Furthermore, the eyeglasses will have an appearance and weight which are readily acceptable to eyeglass wearers, being very similar to most eyeglasses worn for optical correction or sun protection. Utilizing a power source which is not in contact with the eyeglasses is essential to maintaining a customary and comfortable weight for the eyeglasses, while still enabling sufficient power to be generated to accomplish defogging throughout a day of winter activity.

Energy conservation is still advisable, to decrease the size of the power source which must be held by or attached to the user. A number of methods are utilized to enable a relatively light weight battery pack to be used as the power source. First, a timer mechanism may be connected to the power source. The user may activate the power source when defogging becomes necessary, and rely on the timer to turn the power source off a predetermined time period later. This may be particularly useful when snow skiing, if the user can estimate the period of time during which he will be skiing down a particular slope. By properly estimating the appropriate length of time for the power source to be turned on, the user can avoid using up battery life when defogging is not required.

Secondly, the power source may be connected to a power regulator, which varies current produced by the power source. This power regulator can be used to both provide for a range of power levels which would be suitable for a range of fogging conditions and to provide consistent defogging at a given power level over a range of battery voltages as the batteries age. In this way, the current generated by the power source may be conserved, rather than permitting excessive current to be generated in the early life of the batteries or in light fogging conditions.

Thirdly, the power source may be conserved by causing the defogging means to be selectively applied, so that the area of the lenses most subject to fogging may be heated more than other areas of the lenses. The portion of the lenses which are nearest to the user's nose tend to accumulate condensation more quickly than other areas of the lenses, in part because of reduced air circulation near the nose and higher relative humidity in the air space adjacent to that part of the lenses. When the lenses have been made conductive by application of a conductive coating, increased heat generation may be achieved in selected portions of each lens by connecting the conductive path to a first contact point in contact with the lens near the nose, and on the opposite side of that lens connecting the conductive path to a second contact point of longer length than the first contact point, where both contact points form the sole connections between the conductive path and the lens.

The novel features that are considered characteristic of the invention are set forth with particularity in the claims. The invention itself, both as to its construction and its method of operation, together with additional objects and advantages thereof, will best be understood from the description of specific embodiments which follows, when read in conjunction with the accompanying drawings.

BRIEF DESCRIPTION OF THE DRAWINGS

FIG. 2 is a front view of one embodiment of eyeglasses according to the present invention.

FIG. 3 is an interior view of a right temple segment of eyeglasses according to the present invention.

DETAILED DESCRIPTION OF THE PREFERRED EMBODIMENT

Figure 1:
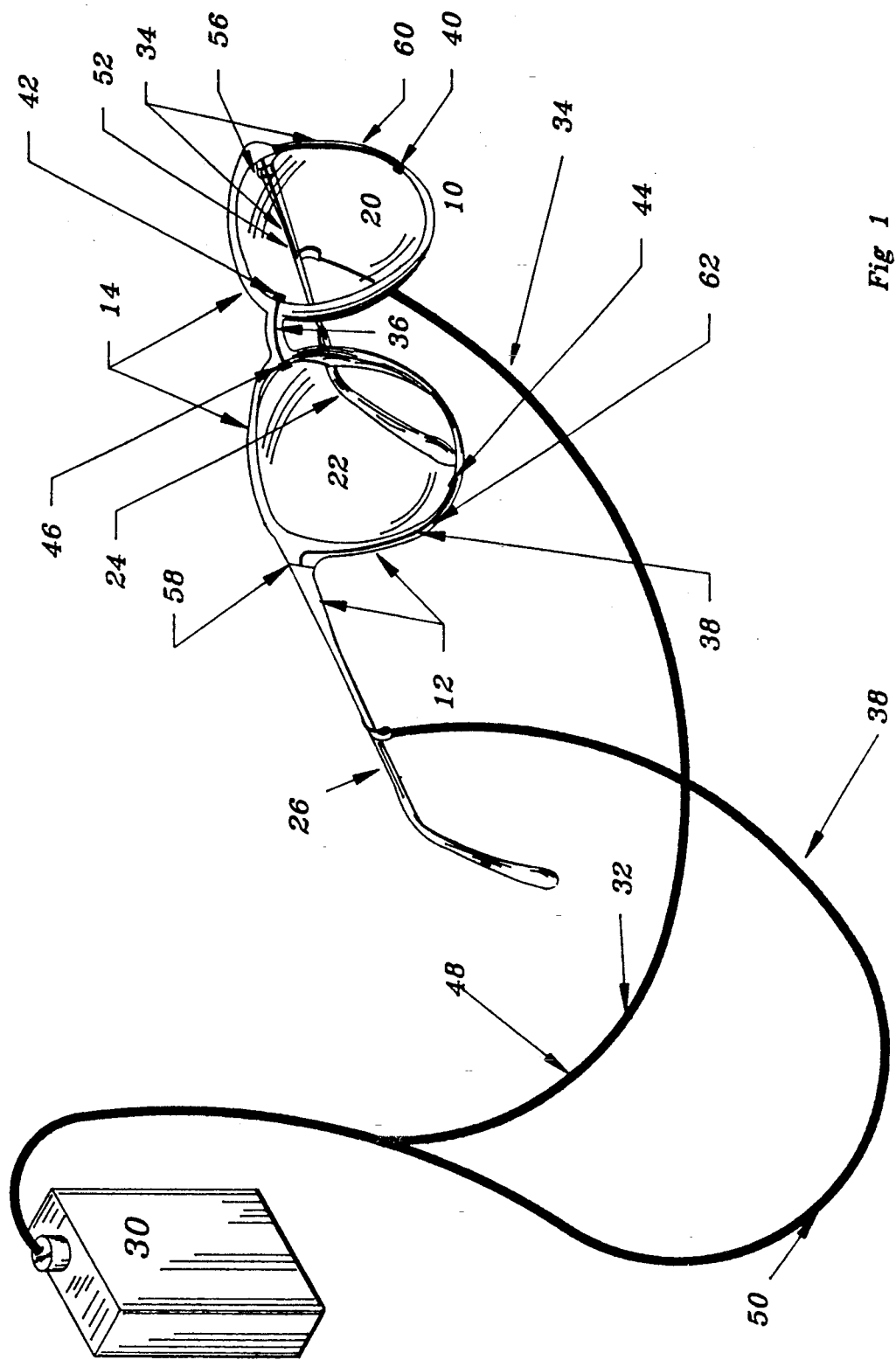
FIG. 1 is a perspective view of eyeglasses equipped with a defogging mechanism used in this method of removing condensation from eyeglasses.

The method of defogging eyeglasses according to the present invention can be better understood by reference to FIG. 1. Eyeglasses 10 typically include a frame 12 comprising a lens holding segment 14, a left temple segment 24, and a right temple segment 26. A left lens 20 and right lens 22 are held in place by the lens holding segment 14.

The lenses 20,22 may be heated to remove condensation, thus defogging the lenses, by making those lenses 20,22 part of an electrical circuit to which power is supplied from a power source 30. The power source 30 will necessarily have significant weight if defogging is to be accomplished for a period of more than a few hours. As a result, it is advantageous to locate the power source 30 in a position which is physically separate from the eyeglasses 10. The power source 30 may be conveniently attached to the user's belt or other clothing (not shown).

The conductive path which includes the power source 30 and the lenses 20,22 may be constructed in a variety of ways. A series configuration may be most convenient when the lens holding segment 14 is constructed of non-conductive materials. In this configuration, a left conductive path 34 runs from the power source 30 to an outer left contact point 40 in contact with the left lens 20. A bridge conductive path 36 runs from an inner left contact point 42 in contact with the left lens 20 to an inner right contact point 46 in contact with the right lens 22. A right conductive path 38 runs from an outer right contact point 44 in contact with the right lens 22 to the power source 30.

The conductive path is completed by making the lenses 20,22 capable of conducting electricity. A number of methods of making the lenses 20,22 conductive are possible. The lenses 20,22 may be coated with a transparent conductive coating, such as indium tin oxide. Alternatively, the lenses 20,22 may be coated with a thin metallic film, or simply constructed out of conductive materials. The lenses 20,22 could also be formed in multiple layers, with conductor arrays (not shown) held between the layers.

As can be seen in FIG. 1, the left conductive path 34 may comprise a left detached conductive wire 48 leading from the power source 30 to the left temple segment 24, a left temple conductive wire 52 attached to the interior of the left temple segment 24, a conductive left hinge 56 in contact with the left temple conductive wire 52, and a left frame conductive wire 60 leading from the left hinge 56 along the lens holding segment 14 to an outer left contact point 40 in contact with the left lens 20. Similarly the right conductive path 38 may comprise a right detached conductive wire 50, a right temple conductive wire 54 attached to the right temple segment 26 and shown in FIG. 3, a conductive right hinge 58 in contact with the right temple conductive wire 54, and a right frame conductive wire 62 leading from the right hinge 58 along the lens holding segment 14 to an outer right contact point 44 in contact with the right lens 22. The detached conductive wires 48,50 may be advantageously connected to a neck strap 32 leading from the temple segments 24,26 to the power source 30. The use of a neck strap 32 safely keeps the detached conductive wires 48,50 behind the user's head and back (not shown) when the power source 30 is attached to the user's belt (not shown) at the user's side or back.

The detached conductive wires 48,50 may be permanently attached to a particular point on each temple segment 24,26, at which point the applicable temple conductive wire 52,54 intersects the detached conductive wire 48,50. Alternatively, as shown in FIG. 3, the detached conductive wires 48,50 may be movably attached to the applicable temple segments 24,26 so that the conductive wires 48,50 may freely move along the temple segments 24,26, while intersecting the applicable temple conductive wire 52,54 at any point along the temple segments 24,26.

Figure 5:
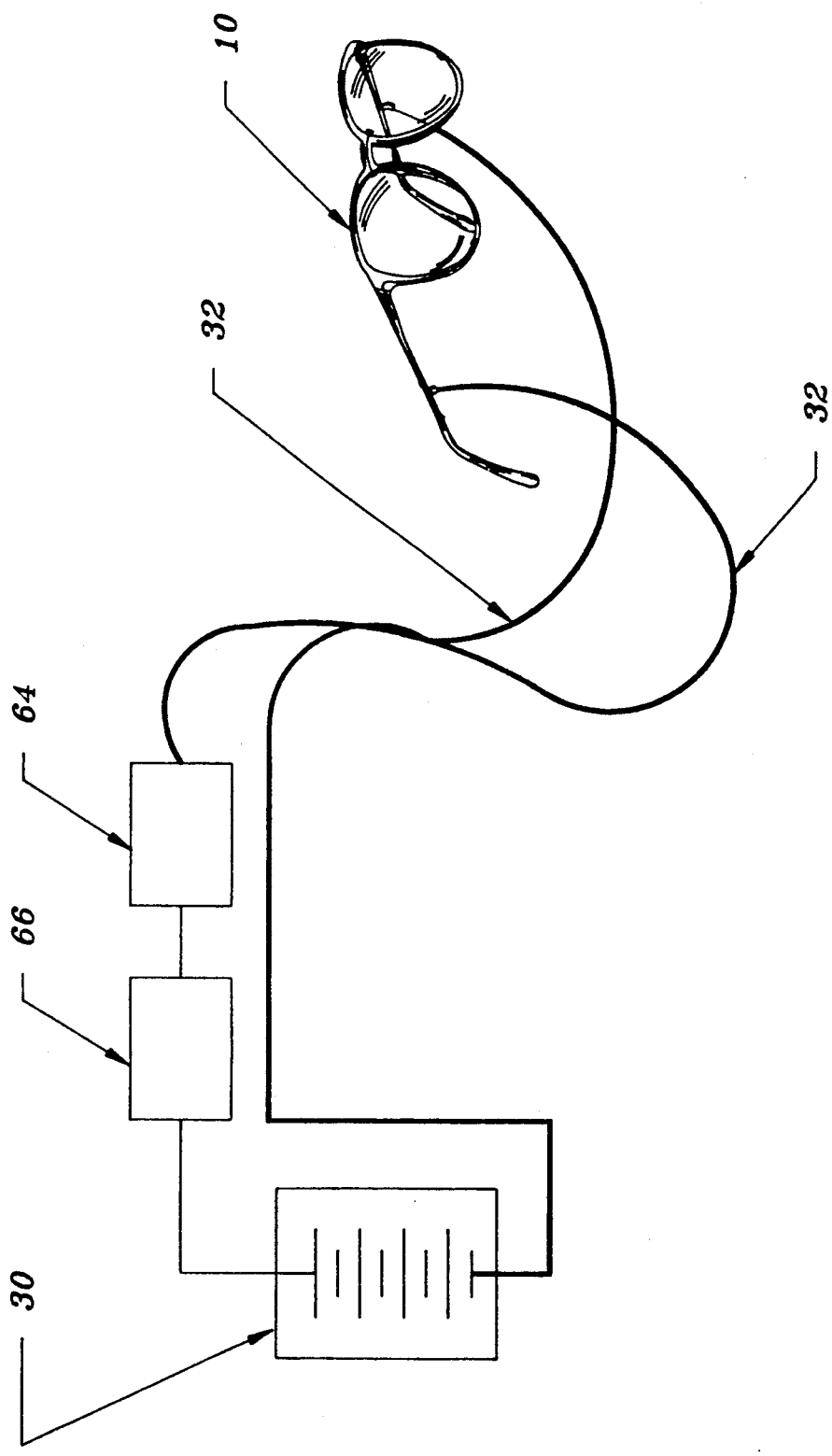
FIG. 5 is a schematic view of a portion of the defogging mechanism according to the present invention.

To facilitate use of a relatively small and light weight power source 30, while still enabling defogging to occur for a full day of use, a number of features can be implemented. As shown in FIG. 5, a timer 64 may be connected to the power source 30. The timer 64 enables the user to select a predetermined period of time during which power will be supplied by the power source 30 to accomplish defogging of the lenses 20,22, at the time the power source 30 is turned on by the user. The user can estimate the appropriate period of time during which fogging is likely to occur, and set the timer 64 to correspond to that period of time. The power source 30 will then automatically turn off at the end of the chosen period of time, conserving power when defogging is unlikely to be needed.

A battery pack of multiple batteries may advantageously be used as the power source 30. As shown in FIG. 5, a power regulator 66 may be connected to the power source 30. The regulator 66 varies current produced by the power source 30. The power regulator 66 should be an efficient type rather than a type which dumps excess current into a control load. An advantageous embodiment of the regulator 66 is one which rapidly switches the current produced by the power source 30 on and off over the time interval that power is being regulated in such a way that the ratio of time-on to time-off varies inversely as the square of the voltage.

The power regulator 66 of the current averaging type described above can be implemented by known digital or analog circuit techniques such as the use of a microcontroller or voltage integrator. The regulator circuitry should consume substantially less power than is being supplied to the eyeglasses 10 and need only be active over the time interval determined by the timer 64.

A particularly unique aspect of the instant invention is conservation of the power source 30 by selectively heating the lenses 20,22, to provide the most heat and defogging in the area of the lenses 20,22 most likely to experience fogging. The portion of the lenses 20,22 which are nearest to the user's nose (not shown) tend to accumulate condensation more quickly than other areas of the lenses 20,22, in part because of reduced air circulation near the nose and higher relative humidity in the air space adjacent to that part of the lenses 20,22. Increased heat generation may be selectively achieved in these portions of each lens 20,22 by connecting each frame conductive wire 60,62 to outer contact points 40,44 which are longer in length than the inner contact points 42,46 which are adjacent to that portion of the lenses 20,22 most likely to experience fogging, as shown in FIG. 2. In this manner, more heat may be generated next to the inner contact points 42,46, most efficiently using energy available from the power source 30 to selectively defog those portions of the lenses 20,22 most susceptible to fogging.

Figure 4:
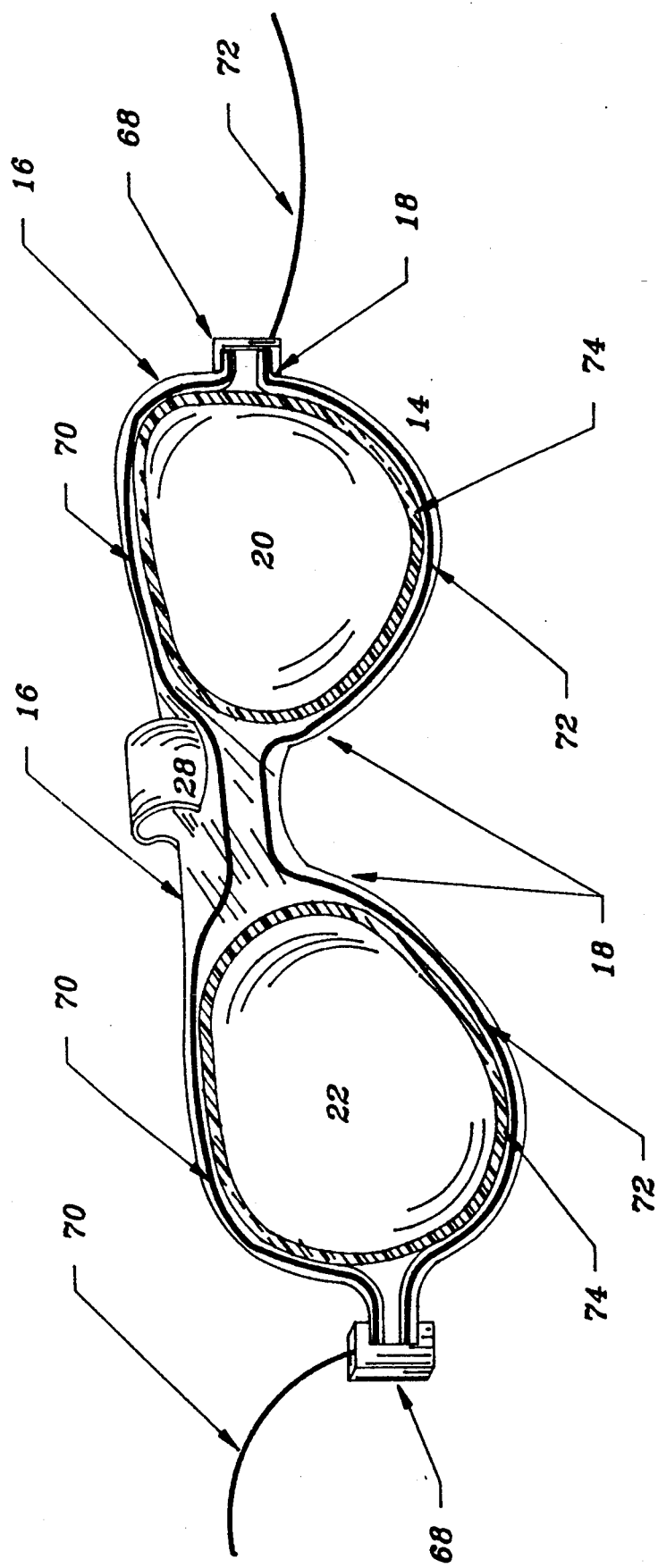
FIG. 4 is an exterior view of a lens holding segment of one embodiment of eyeglasses according to the present invention.

An alternative circuitry design for the conductive path is illustrated in FIG. 4. The parallel configuration shown in FIG. 4 may be particularly advantageous for use in eyeglasses 10 which are metallic or otherwise composed of conductive materials. The parallel configuration is also useful for construction of eyeglasses 10 which clip on to existing spectacles, such as prescription glasses, to enable defogging of those glasses while achieving an appearance which is typical of clip-on sunglasses.

In the parallel configuration, the lenses 20,22 are held in place by an upper lens holding segment 16 and a lower lens holding segment 18. These dual lens holding segments 16,18 are electrically separated from each other. The upper lens holding segment 16 is secured to the lower lens holding segment 18 by one or more non-conductive securing mechanisms 68. The upper and lower lens holding segments 16,18 may be held in place on the user's face by left and right temple segments 24,26. Alternatively, the upper and lower lens holding segments 16,18 may be attached to a pair of spectacles (not shown) to be worn by the user, by a clip on attachment mechanism 28 as shown in FIG. 4. When the clip-on method of attachment is used, the defogging lens holding segments 16,18 will typically be held in place on the interior of the user's spectacles (not shown). However, it is also possible to attach the defogging lens holding segments 16,18 to the exterior of the user's spectacles, similar to the customary design of clip-on sunglasses. An air blocking means 74 lining the lenses 20,22 or the upper and lower lens holding segments 16,18 may be constructed of foam rubber or other material which will effectively block air but will not cause damage to the lenses of the spectacles. The air blocking means 74 contacts the spectacles to prevent air from moving into the region between the eyeglasses 10 and the spectacles to which they are attached.

As can be seen in FIG. 4, a parallel configuration of the conductive path including the power source 30 and the lenses 20,22 may be constructed by running a wire forming an upper conductive path 70 from the power source 30 to a point on the upper lens holding segment 16 which is in electrical contact with both lenses 20,22. A second wire, forming the lower conductive path 72, can be run from the power source 30 to a point on the lower lens holding segment 18 in electrical contact with both lenses 20,22. If the eyeglasses 10 are held in place by left and right temple segments 24,26, such as metal rim sunglasses, then the upper conductive path 70 may be run to one of the temple segments 24,26, and the lower conductive path 72 may be run to the other temple segment 24,26. One of the temple segments 24,26 would then be attached to the upper lens holding segment 16, while the other temple segment 24,26 would be attached to the lower lens holding segment 18. The conductive path may be completed by making the lenses 20,22 conductive.

The invention has been described in detail with particular reference to preferred embodiments thereof. As will be apparent to those skilled in the art in the light of the accompanying disclosure, many alterations, substitutions, modifications, and variations are possible in the practice of the invention without departing from the spirit and scope of the invention.

I claim:

1. Eyeglasses with defogging means to be worn by a user, comprising:
    (a.) frame member comprising a non-conductive lens holding segment and an attachment means by which said lens holding segment is secured in a position so that the user looks through said lens holding segment,
    (b.) a left lens and a right lens held by said lens holding segment,
    (c.) power source which is not in direct physical contact with said frame member,
    (d.) power limitation means which is not in direct physical contact with said frame member and which is connected to said power source to automatically limit power usage,
    (e.) left conductive path leading from said power source to a conductive outer left contact point in contact with said left lens,
    (f.) bridge conductive path leading from a conductive inner left contact point in contact with said left lens to a conductive inner right contact point in contact with said right lens,
    (g.) right conductive path leading from a conductive outer right contact point in contact with said right lens to said power source, and
    (h.) lens conductive means for making said lenses capable of conducting an electric current,
    (i.) wherein said left conductive path, bridge conductive path, right conductive path, and lens conductive means together comprise a conductive path means by which electrical current generated by said power source may be conducted to said lenses and back to said power source to form an electric circuit, thereby heating said lenses.

2. Eyeglasses as described in claim 1, wherein said attachment means further comprises a left temple segment and a right temple segment attached to said lens holding segment and wherein said left conductive path further comprises:
    (a.) left detached conductive wire leading from said power source to said left temple segment,
    (b.) left temple conductive wire attached to said left temple segment, connected on one end to said left detached conductive wire, and connected on an opposite end to a conductive left hinge whereby said left temple segment is movably attached to said lens holding segment,
    (c.) left frame conductive wire attached to said lens holding segment connected at one end to said left hinge and at the other end to said outer left contact point.

3. Eyeglasses as described in claim 2, wherein said attachment means further comprises a left temple segment and a right temple segment attached to said lens holding segment and wherein said right conductive path further comprises:
    (a.) right detached conductive wire leading from said power source to said right temple segment, (b.) right temple conductive wire attached to said right temple segment, connected on one end to said right detached conductive wire, and connected on an opposite end to a conductive right hinge whereby said right temple segment is movably attached to said lens holding segment, (c.) right frame conductive wire attached to said lens holding segment connected at one end to said right hinge and at the other end to said outer right contact point.

4. Eyeglasses as described in claim 1, in which said lens conductive means comprises a transparent conductive coating applied to said lenses.

5. Eyeglasses as described in claim 4, in which said transparent conductive coating comprises indium tin oxide.

6. Eyeglasses as described in claim 1, in which said lens conductive means comprises lenses constructed of a plurality of layers, with conductor arrays held between said layers.

7. Eyeglasses as described in claim 1, in which said lens conductive means comprises a thin metallic film applied to said lenses.

8. Eyeglasses as described in claim 1, in which said lens conductive means comprises constructing said lenses from a conductive material.

9. Eyeglasses as described in claim 1, in which:
(a.) said inner left contact point is connected to said left lens adjacent to an area most likely to be fogged by condensation,
(b.) said inner left contact point has a predetermined length, and
(c.) said outer left contact point has a length which is longer than said predetermined length of said inner left contact point.

10. Eyeglasses as described in claim 1, in which:
(a.) said inner right contact point is connected to said right lens adjacent to an area most likely to be fogged by condensation,
(b.) said inner right contact point has a predetermined length, and
(c.) said outer right contact point has a length which is longer than said predetermined length of said inner right contact point.

11. Eyeglasses as described in claim 3, further comprising:
(a.) attachment means for attaching said power source to an article of clothing worn by the user, and
(b.) neck strap extending from said power source to said right temple segment and to said left temple segment, so that said right detached conductive wire may be attached to said neck strap.

12. Eyeglasses as described in claim 1, in which said attachment means further comprises a clipping mechanism for attaching said lens holding segment to frames of spectacles worn by the user.

13. Eyeglasses as described in claim 12, further comprising air blocking means connected to each of said lenses so that said air blocking means contacts the spectacles to prevent air from moving between said lenses and the spectacles.

14. Eyeglasses with defogging means to be worn by a user, comprising:
(a.) frame member comprising a lens holding segment and an attachment means by which said lens holding segment is secured in a position so that the user looks through said lens holding segment,
(b.) a left lens and a right lens held by said lens holding segment,
(c.) wherein said lens holding segment further comprises a conductive upper lens holding segment, a conductive lower lens holding segment, and a nonconductive holding segment securing means by which said upper lens holding segment is secured to said lower lens holding segment so that said right lens and said left lens are held between said upper lens holding segment and said lower lens holding segment, and
(d.) power source which is not in direct physical contact with said frame member,
(e.) power limitation means which is not in direct physical contact with said frame member and which is connected to said power source to automatically limit power usage,
(f.) upper conductive path leading from said power source to said upper lens holding segment and from said upper lens holding segment to said right lens and to said left lens,
(g.) lower conductive path leading from said right lens and said left lens to said lower lens holding segment and from said lower lens holding segment to said power source, and
(h.) lens conductive means for making said lenses capable of conducting an electric current,
(i.) wherein said upper conductive path, said lower conductive path, and said lens conductive means together comprise a conductive path means by which electrical current generated by said power source may be conducted to said lenses and back to said power source to form an electric circuit, thereby heating said lenses.

* * * * *